(12) United States Patent
Selcer

(10) Patent No.: US 6,484,920 B1
(45) Date of Patent: Nov. 26, 2002

(54) CABLE UMBILICAL GRIPPER

(75) Inventor: Toby Selcer, College Station, TX (US)

(73) Assignee: Dynacon, Inc., Bryan, TX (US)

( * ) Notice: Subject to any disclaimer, the term of this patent is extended or adjusted under 35 U.S.C. 154(b) by 0 days.

(21) Appl. No.: 09/704,404

(22) Filed: Nov. 1, 2000

(51) Int. Cl.⁷ .............................................. B65H 20/16
(52) U.S. Cl. ........................ 226/172; 226/173; 226/186
(58) Field of Search ................................ 226/172, 173, 226/186, 195

(56) References Cited

U.S. PATENT DOCUMENTS

| | | | |
|---|---|---|---|
| 1,759,105 A | | 5/1930 | Evans |
| 2,297,295 A | * | 9/1942 | Flintjer .................... 226/172 X |
| 3,275,300 A | | 9/1966 | Delacour et al. |
| 3,465,941 A | * | 9/1969 | Fournier ................. 226/186 X |
| 4,013,205 A | * | 3/1977 | Fabre-Curtat et al. ...... 226/173 |
| 4,508,251 A | | 4/1985 | Harada et al. |
| 4,817,845 A | * | 4/1989 | Franchuk .................... 226/172 |
| 5,009,353 A | | 4/1991 | Alquist |
| 5,082,248 A | | 1/1992 | Harig |
| 5,309,990 A | * | 5/1994 | Lance .................... 226/172 X |
| 5,533,658 A | * | 7/1996 | Benedict et al. ............. 226/172 |
| 5,839,636 A | * | 11/1998 | Fleischmann ............. 226/17 X |
| 6,189,609 B1 | * | 2/2001 | Shaaban et al. ........ 226/172 X |

* cited by examiner

Primary Examiner—Michael R. Mansen
Assistant Examiner—Minh-Chau Pham
(74) Attorney, Agent, or Firm—McHale & Slavin

(57) ABSTRACT

A linear cable engine (LCE) uniquely grips a cable so as to avoid damage to the protective/insulative sheath thereon during retrieval and deployment. The LCE includes a design which encompasses the cable and actually applies pressure radially to the cable. This allows for the application of much higher force as the cable is in a state of hydrostatic stress resulting in a higher allowable tension on the cable. Deformable polymeric gripping elements are mounted to the outer surface of the driving mechanism. Each of the gripping elements, which may be an elastomeric block or annular tire-shaped member, has a profiled surface effective to embrace the cable and is identical in shape and construction, one or another. The elements have an indention capable of matching one or more given cable radii and a hollow or gel filled cross-section which may contain strategically placed stiffeners.

5 Claims, 3 Drawing Sheets

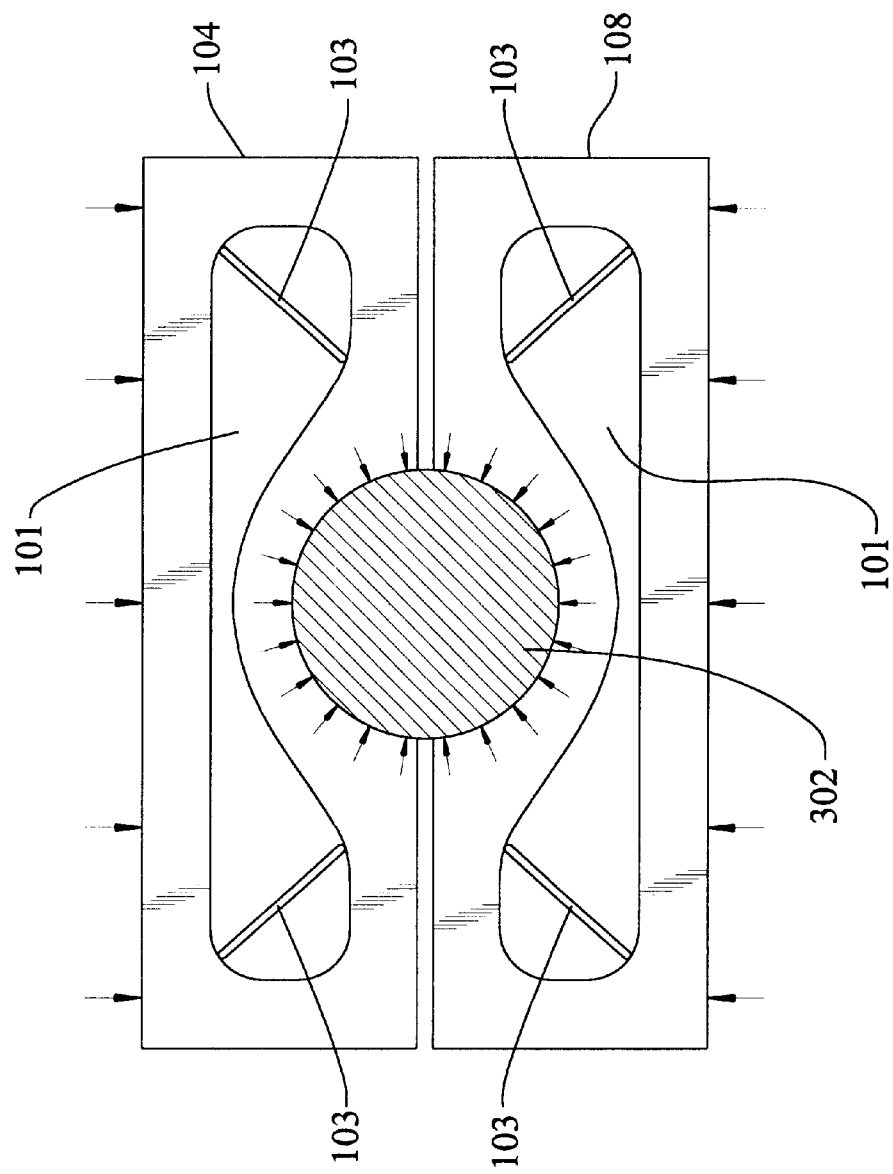

CABLE UMBILICAL GRIPPER

FIELD OF THE INVENTION

This invention relates to devices for retrieving and deploying lengths of cable, particularly to devices for manipulating umbilical cables which serve as controls or tethers for underwater devices, and most particularly to linear cable engines which are designed for gripping an umbilical cable during transport without damaging the cable by providing a gripping mechanism which encompasses the cable and applies pressure radially thereto.

BACKGROUND OF THE INVENTION

Linear cable engines (LCE), as referred to herein are not engines, but rather refer to a linear winch or tensioning device for cable. Rather than spooling the cable up on a drum as a conventional winch does, a LCE allows the cable to pass through in a straight line and continue on to another device or alternatively deployed overboard.

There are generally two types of LCE in use today: multi-tire and track.

The multi-tire system consists of a series of vertically mounted truck tire/wheel combinations, all of which are powered with hydraulic motors. Each pair roll on one another with the cable passing between them passing the cable to the next pair. These matched pairs are mounted on a long frame and the number of tire pairs is determined by the desired tension.

The track system consists of a pair of rubber or polymeric tracks mounted similarly to the tire system. These tracks are also hydraulically powered as the multi-tire system. Some manufacturers of the track systems will have a semicircular indention in the track to accommodate the cross section of the cable being handled. Either of these systems are used to lift the product cable from a holding tank on the cable lay ship and feed it overboard if no installation tension is needed. If the product cable requires back tension or the recovery of a previously laid cable is required, the LCE provides back tension for a capstan winch (better known as a cable drum engine). The cable lay ships carry all this equipment as they must be prepared for any type of circumstance as well as many types of product cable.

The Multi-tire LCE was the first concept to gain wide industry acceptance. One of the main problems with this system is that it takes up valuable deck space as many pairs of tires are required to develop the tensions required. Additionally, this system does not guide the cable well thus alignment is very critical. Furthermore, multi-tire LCEs often strip the protective sheath from the product cable in times of high tension requirements. Such systems are a maintenance problem as there are many hydraulic motors along with their corresponding plumbing necessary, they are difficult to keep "in tune" as there are many pairs that must stay in time to "share the load".

With regard to Track type LCEs, these systems improve upon the multi-tire systems in that they better utilize deck space, are typically capable of applying higher tensions, utilize less hydraulic motors and require less plumbing for a given tension rating, are less susceptible to alignment problems as the tracks have a wider contact surface, can be produced with a groove aligned in the cable travel direction adding to the available "cable grip", and are used sub-sea in combination with the latest technology sea plows. This system also suffers, however, in that it often strips the protective sheath from the product cable in times of high tension requirements.

DESCRIPTION OF THE PRIOR ART

U.S. Pat. No. 4,508,251 discloses a cable pulling/feeding apparatus having a fixed base, a cable pulling/feeding unit inclusive of a drive/brake unit for pulling or feeding a cable, a load detecting sensor, and structure for determining a load applied to the drive/brake unit in response to a signal to pull or feed the cable. The patent fails to apply radial pressure to the cable, as instantly disclosed—see particularly FIG. 4.

U.S. Pat. No. 5,009,353 discloses a cable tensioner having a pair of elongated platforms in side-by-side relationship for driving the cable. Belts, formed from a high friction material are designed with a groove therein to match the diameter of the cable. This patent, although applying pressure about the cable's circumference, does so by pressing the two gripping halves together, and thus also fails to disclose a gripping element which utilizes radially applied pressure to evenly grip the belt.

U.S. Pat. No. 5,082,248 provides an apparatus for pulling on a line. A drive pulley with a circumferential groove is provided and a loop of the line is held therein. A radial cable gripping element is not disclosed in the patent.

U.S. Pat. No. 1,759,105 provides a die for laying wire rope and wire rope strands. The die elements on opposing chains come together to provide a gripping force. Again, this device fails to teach a gripping element which generates radial pressure upon the wire/cable.

U.S. Pat. No. 3,275,300 teaches a device for transporting conduit in a well drilling environment wherein pairs of clamps are brought together as they are articulated on shackles which are attached to endless chains. The clamps grip the conduit and urge it along in the direction of rotation of the endless chains. The device fails to teach a gripping element which generates even radial pressure upon the wire/cable.

What is lacking in the prior art is a cable umbilical gripping device having a gripping element which utilizes radially applied pressure to evenly grip the cable. In a particularly preferred embodiment the gripping device includes a deformable polymeric gripping element which aids in applying even gripping and transfer of tension to the cable. The ability to provide even tension upon the cable as a result of deformation of the polymeric or gel-filled blocks significantly reduces cable wear and damage.

SUMMARY OF THE INVENTION

The instant invention teaches an LCE which uniquely grips a cable, e.g. a marine umbilical cable, so as to avoid damage to the protective/insulative sheath thereon. The LCE as described in the instant invention includes either a track or tire type LCE having a design which encompasses the cable and actually applies pressure radially to the cable. This allows for the application of much higher force as the cable is in a state of hydrostatic stress resulting in a higher allowable tension on the cable.

The currently available designs either use a flat track or an indented track. While the indented track increases the contact surface to the cable, it, like the flat track, only applies pressure to the cable in one direction. This limits the amount of force that can be applied before internal damage occurs in the cable due to Poisson's effect.

In accordance with the instant invention, the tracks are modified from a smooth continuous belt to a smooth or segmented continuous belt, a chain, or the like conveying means containing polymeric blocks attached to the outer surface. Each block is identical in shape and construction. The blocks have a semi-circular indention that matches a given cable radius and a hollow (air-filled) cross-section or deformable media filled, e.g. a gel-filled cross-section with optional strategically placed stiffeners. When the cable is squeezed between the two tracks, the sidewalls of the block are pulled towards the cable creating a horizontal loading.

The benefit achieved by the instant LCE is that the LCE can be used at higher tensions for a given cable or less LCE's can be used for a given tension resulting in less required deck space. Both of these are due to the fact that a better grip on the cable will allow better transfer of tension to the cable and raise the tension at which damage might occur.

Accordingly, it is an objective of the instant invention to teach an LCE wherein the tracks are modified to contain polymeric blocks bolted to the outer surface of the track; each block being identical in shape and construction.

It is an additional objective of the instant invention to teach a tire type LCE wherein the circumferential surface of the tire is modified to present an elastomeric profiled surface effective to embrace the cable.

It is a further objective of the instant invention to teach a modified LCE wherein the blocks have a semi-circular indention that matches a given cable radius and a hollow cross-section or deformable media-filled cross-section which may further contain strategically placed stiffeners.

It is yet another objective of the instant invention to teach an LCE and method for its use, which can be used at relatively higher tensions, compared to prior art LCEs, for a given cable, or less LCE's can be used for a given tension resulting in less required deck space; due to the fact that a better grip on the cable will allow better transfer of tension to the cable and raise the tension at which damage might occur.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE FIGURES

FIG. 3 is a cross-sectional view of a cable interacting with a pair of opposing elastomeric cable encircling blocks;

DETAILED DESCRIPTION OF THE INVENTION

Figure 1:
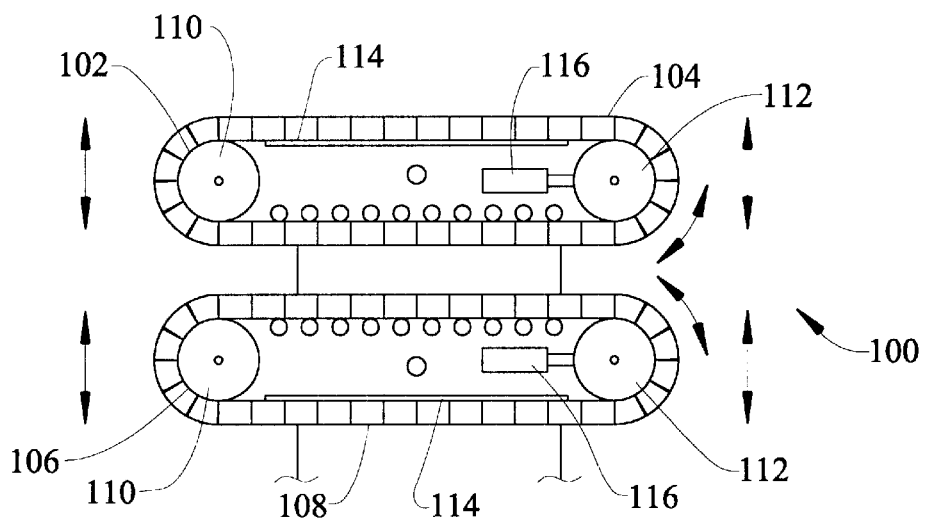
FIG. 1 is a side view of a track-type LCE including elastomeric cable encircling blocks.

With reference to FIG. 1, a track type linear cable engine (LCE) is generally referred to at 100. The LCE is useful for propulsion of a marine umbilical cable and comprises a first conveying means or track 102 having a first plurality of deformable polymeric gripping elements 104 mounted in spaced relation upon an outermost surface of said first conveying means. A second conveying means or track 106 is further provided having a second plurality of deformable polymeric gripping elements 108 which are mounted in spaced relation upon an outermost surface of said second conveying means. Various means of mounting and driving the tracks are contemplated within the inventive concept. For purposes of illustration, the invention is depicted wherein each conveying means is mounted about an idler sheave 110 and a driven sheave 112, e.g. a hydraulically driven sheave. The conveying means or tracks may be supported at their intermediate portions by a low friction slider block 114 and the track, which may be in the form of a smooth or segmented continuous belt, chain, or the like conveying means, is tightened by means of a ram tensioning device 116. One or more drive means 120 are constructed and arranged to provide rotational movement of said first and second conveying means whereby said first and second conveying means are traversed in counter-rotating relation. Each of said first and second plurality of deformable polymeric gripping elements, 104 and 108 respectively, includes an elastomeric profiled surface which is effective to embrace the outer circumferential area of the cable (see FIG. 2). In operation, the rotational movement of the first and second conveying means cause opposing pairs of said first and second plurality of deformable polymeric gripping elements to converge in opposing relationship about the outer circumferential area of the cable. In this manner, the opposing pairs of deformable polymeric gripping elements encompass the cable and apply sufficient radial pressure thereto so as to be effective to propel the cable in a desired direction.

Figure 2:
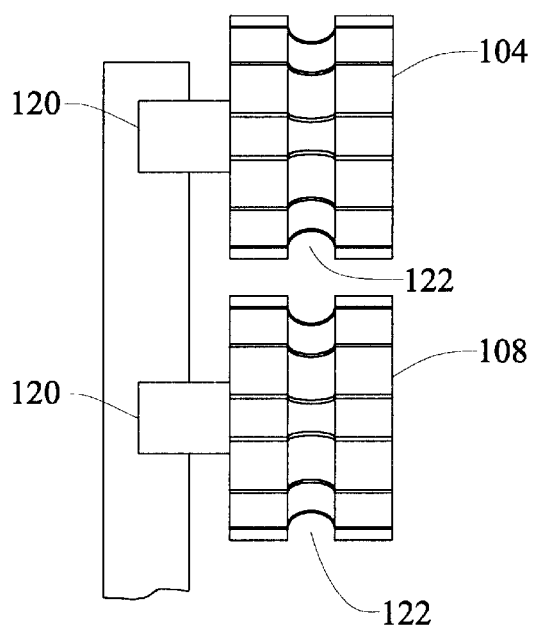
FIG. 2 is an end view of a track-type LCE including elastomeric cable encircling blocks.

FIG. 2 is an end view which illustrates the interrelationship between the first and second conveying means having the deformable polymeric gripping elements 104 and 108 mounted thereon.

Now referring to FIG. 3, a cross-sectional view of the deformable polymeric gripping elements is shown. A pair of deformable polymeric gripping elements 104,108 are shaped so as to best encompass the cable 302 and apply sufficient radial pressure thereto as the elements converge during the counter rotating motion of the first and second conveying means. Although the indention 122 is illustrated as having a constant radius, it is contemplated to form the indention with a graduated profile so as to enable compression about a cable of varying dimension, e.g. a cable having additional flotation devices mounted thereabout. This enables the cable to be propelled in the desired direction. As illustrated, the elements 104,108 contain a cavity 101 which is either hollow (air filled) or filled with a deformable media, e.g. a gel, semi-rigid foam, or the like media effective to aid in providing the requisite gripping pressure. Optionally, stiffening members 103 may be positioned within the hollow or deformable media-filled cavity.

Figure 4B:
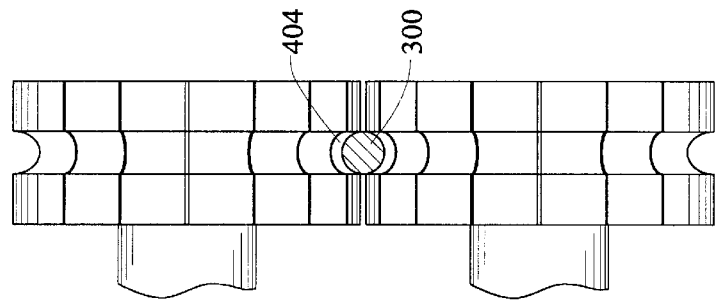
FIG. 4b is an end view of a tire-type LCE including a tire profile modified to include elastomeric cable encircling features.
Figure 4A:
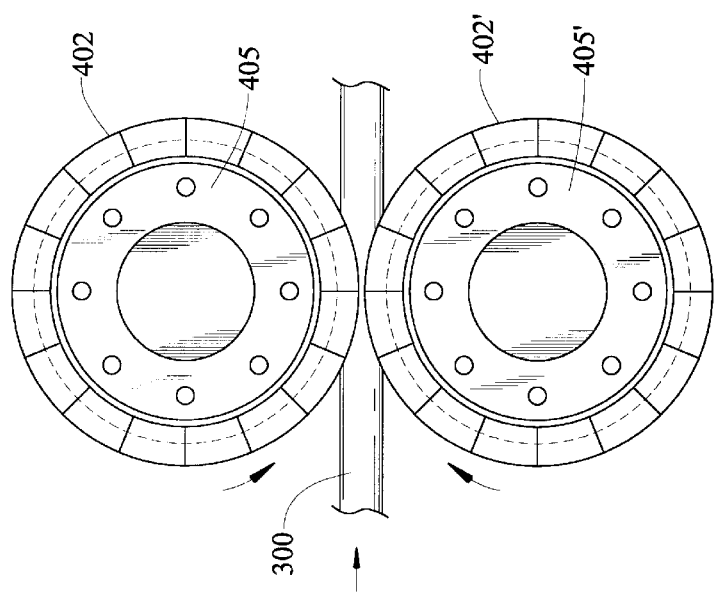
FIG. 4a is a side view of a tire-type LCE including a tire profile modified to include elastomeric cable encircling features.

With reference to FIGS. 4a and 4b, a side and end view, respectively are shown of a tire type linear cable engine. Tires 402, 402' are formed from an annularly shaped elastomeric material having sufficient deformation properties to enable a rounded groove or indention, 404, which is formed in the outermost surface of each tire 402, 402' to encompass the cable 300. The indention is formed so as to match one or more given cable radii, thus enabling umbilical cables having variable diameters to be traversed. The tires are mounted upon conveying means 405,405' which in a preferred embodiment are illustrated as circular hubs. As the tires rotate in counter rotating relation, sufficient radial pressure is applied to the cable 300 to provide lateral propulsion of the cable in the desired direction. Although a single pair of tires is sufficient for the tire LCE to function, in practice, multiple pairs of tires are generally utilized.

Both the tire and track style of LCE, as taught in accordance with the instant invention, are advantageous in that the radial compression provides a distributed form of pressure about the entire circumferential area of the cable. This configuration allows for a greater degree of total pressure than previously obtainable, without causing injury to the inner components of the umbilical due to a great degree of pressure being applied to a proportionally smaller area, as was the case with prior art devices.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. In a linear cable engine useful for propulsion of a marine umbilical cable having:

a first conveying means having a first plurality of deformable polymeric gripping elements mounted in spaced relation upon an outermost surface of said first conveying means;

a second conveying means having a second plurality of deformable polymeric gripping elements mounted in spaced relation upon an outermost surface of said second conveying means;

at least one drive means constructed and arranged for rotational movement of said first and second conveying means whereby said first and second conveying means are traversed in counter-rotating relation;

each of said first and second plurality of deformable polymeric gripping elements including an elastomeric indented surface effective to embrace an outer circumferential area of said cable;

wherein said rotational movement of said first and second conveying means cause opposing pairs of said first and second plurality of deformable polymeric gripping elements to converge in opposing relationship about said outer circumferential cable area;

the improvement comprising each of said first and second plurality of deformable polymeric gripping elements including hollow cavities, stiffener elements disposed in said hollow cavities;

whereby opposing pairs of said deformable polymeric gripping elements encompass said cable and apply radial pressure effective to propel the cable in a desired direction.

2. A linear cable engine in accordance with claim 1 wherein:

said cavities are filled with air.

3. A cable engine useful for propulsion of a marine umbilical cable comprising:

a first circular hub conveying means having a plurality of annular first deformable polymeric gripping elements mounted upon an outermost surface of said first conveying means;

a second circular hub conveying means having a plurality of annular second deformable polymeric gripping elements mounted upon an outermost surface of said second conveying means;

said first and second circular hub conveying means arranged in opposing relationship to each other;

at least one drive means constructed and arranged for rotational movement of said first and second circular hub conveying means whereby said first and second circular hub conveying means are rotated in counter-rotating relation;

each of said plurality of first and second annular deformable polymeric gripping elements including a hollow cavity, and an elastomeric indented surface effective to embrace an outer circumferential area of said cable;

wherein said rotational movement of said first and second conveying means causes said indented surface of said plurality of first and second annular deformable polymeric gripping elements to exert a compressive force upon said outer circumferential cable area;

whereby said opposing indented surface of said deformable polymeric gripping elements encompass said cable and apply radial pressure effective to propel the cable in a desired direction.

4. A cable engine in accordance with claim 3 wherein:

said plurality of first and second gripping elements further includes stiffeners within said cavities.

5. A cable engine in accordance with claim 3 wherein:

said cavities are filled with air.

\* \* \* \* \*